United States Patent
Barlow et al.

[11] 3,813,812
[45] June 4, 1974

[54] SYSTEM FOR OPERATING MINIATURE VEHICLES

[75] Inventors: Gordon A. Barlow; Norman Kramer, both of Skokie, Ill.

[73] Assignee: Marvin Glass & Associates, Chicago, Ill.

[22] Filed: Jan. 31, 1973

[21] Appl. No.: 328,404

[52] U.S. Cl. .............................. 46/244 R, 46/244 A
[51] Int. Cl. ............................................ A63h 29/22
[58] Field of Search .......... 46/244 R, 244 A, 244 B, 46/243 LV, 243 M

[56] References Cited
UNITED STATES PATENTS

| | | | |
|---|---|---|---|
| 3,239,963 | 3/1966 | Smith et al. | 46/244 R |
| 3,339,307 | 9/1967 | Floyd et al. | 46/244 R |
| 3,398,480 | 8/1968 | Tsunoda | 46/244 R |

*Primary Examiner*—Antonio F. Guida
*Assistant Examiner*—Robert F. Cutting
*Attorney, Agent, or Firm*—Coffee and Sweeney

[57] ABSTRACT

A system for operating electrically propelled miniature vehicles along a roadbed having side-by-side current conductive lanes with substantially flush tread surfaces and for remotely controlling the vehicles in a manner to turn out and pass one another at the will of the operator as the vehicles are transferred freely from one lane to another. The vehicles are driven by reversible propulsion motors mounted on the vehicle bodies for operating a pair of rear driving wheels connected by a rear axle. The motor rotates a threaded shaft extending fore and aft of the vehicle body, with a nut threaded on the shaft and operatively associated with front steering wheels to turn the steering wheels in opposite directions depending on the fore or aft movement of the nut in response to opposite rotational movement of the threaded shaft. The reversible propulsion motor is operatively connected to the rear axle through gear trains having oppositely oriented one-way clutches so that the rear wheels are driven by the propulsion motor regardless of the direction of operation of the motor.

11 Claims, 8 Drawing Figures

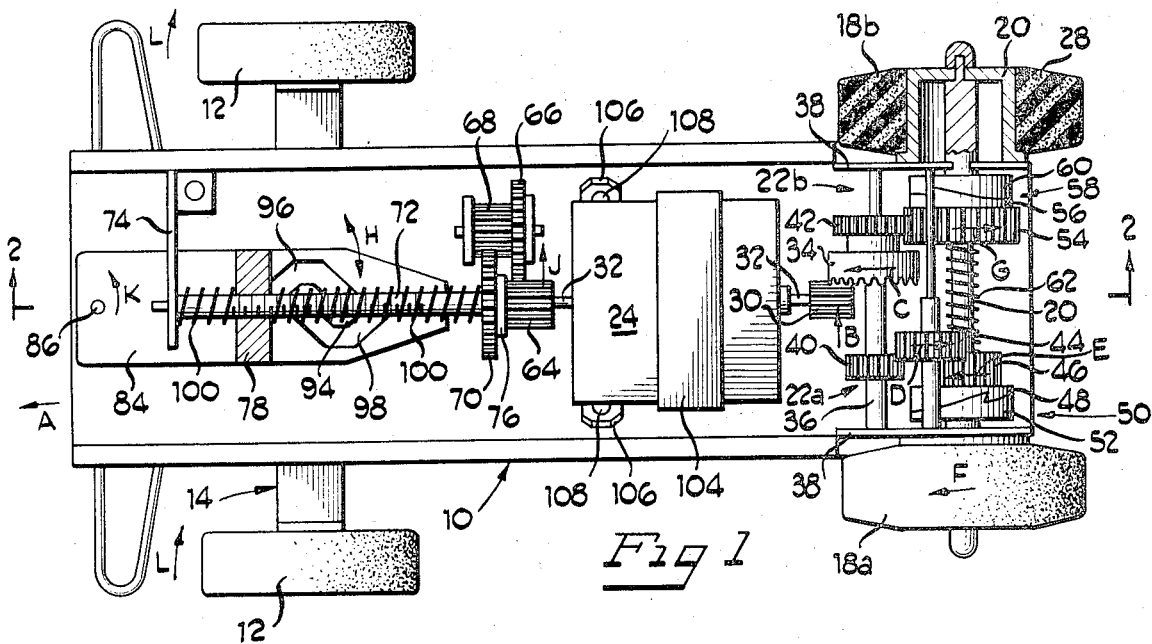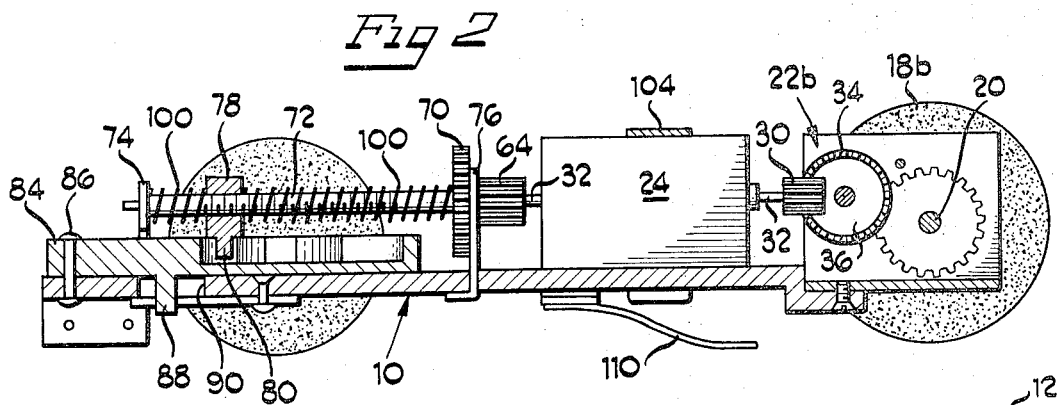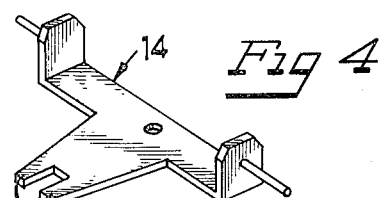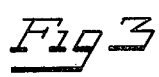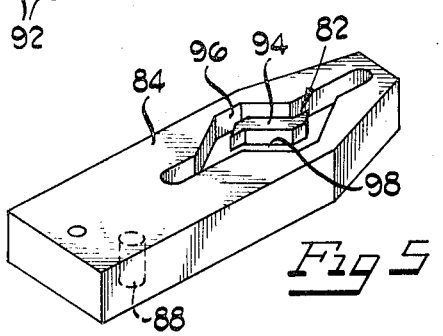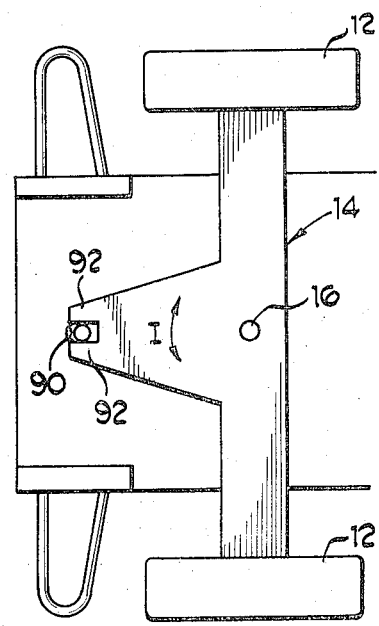

SYSTEM FOR OPERATING MINIATURE VEHICLES

BACKGROUND AND SUMMARY OF THE INVENTION

This invention relates to a system for simulating realistically in a toy, and through means of remote control, characteristics of the travel performance of actual road vehicles represented by miniature travelling replicas of the vehicles. Model automobiles which are driven over toy tracks have become increasingly popular for some time, even more popular than electric trains operable over confining tracks. However, so many of the presently available road racing toys basically are merely extensions of the conventional electric train concept. The vehicles or systems therefore have become known as "slot car" systems wherein the model cars are constrained by virtue of slots and/or guides to a single dimensional or linear path. It is obvious that such a toy has limited realism in operation since the only variable left for the operator is regulation of the speed of travel.

For realism in toys that simulate highway traffic, as differing from toys in the art of toy or model railroading, it is desirable that the miniature road vehicles be free to be steered arbitrarily at the will of the operator without confinement or guidance by upstanding track rails or by slots sunken in the roadbed to be travelled by the vehicle. Also for realism, the toy road vehicles should be steerable in a manner to turn out and pass one another along the route by crossing over from one traffic lane to another at the will of the operator while substantially continuously being propelled by current derived from the roadbed which is substantially flat throughout.

Attempts have been made to provide the operator with this second degree of freedom of operation provided by free steering of the vehicle. This invention is directed to providing a new and improved system for operating electrically propelled miniature vehicles along a predetermined path and for remotely controlling the vehicles in a manner to turn out and pass one another at the will of the operator.

It is, therefore, a general object of this invention, to provide a toy of the character described, particularly such a toy which has more realistic operation and which includes an improved model vehicle movable over a three-dimensional substantially flat tread surface on the track.

The invention contemplates providing a roadbed travelled by the vehicle and having side-by-side current conductive lanes with substantially flush tread surfaces permitting the vehicles to be transferred freely from one lane to another. Each vehicle includes a body provided with a pair of surface engaging driving wheels mounted on the vehicle body and operable by an electrical current responsive reversible propulsion motor also mounted on the vehicle body. Current collectors are mounted on the vehicle body and are operatively connected to the propulsion motor and in contact with conductive portions of the current conductive lanes of the track. Separate remote control mechanisms are provided for each vehicle, in circuit with the current conductive lanes, and are so constructed to permit each of the vehicles to be remotely controlled independently of the control of the other vehicle so as to permit an operator to selectively turn his respective vehicle out and pass another vehicle at will be remotely moving steering means on the vehicle.

In the exemplary embodiment of the invention, the reversible propulsion motor is operatively connected to the pair of driving wheels by gear trains having one-way clutches connected to the axle for the rear driving wheels. The clutches are oppositely oriented in order to drive the rear wheels regardless of the direction of operation of the reversible propulsion motor.

A threaded rod or shaft is mounted on the vehicle body and extends in a fore and aft direction. The threaded shaft is rotated in opposite directions by the reversible propulsion motor. A nut is threaded on the shaft and is moved in a fore and aft direction in response to rotation of the shaft. The nut has a follower pin which extends into slot means on a connector block pivotally mounted on the vehicle body. The connector block, in turn, is connected through lost motion pin and slot means to a cross brace also pivotally mounted on the vehicle body and on which the front steering wheels of the vehicle are mounted. Thus, rotation of the threaded shaft, through the nut and follower pin thereon and the pivoted connector block, pivots the cross brace to turn the steering wheels in opposite directions to steer the vehicle in response to opposite directions of operation of the reversible propulsion motor.

Other objects, features and advantages of the invention will be apparent from the following detailed description taken in connection with the accompanying drawings.

DESCRIPTION OF THE DRAWINGS

FIG. 1 is a top plan view of the chassis of a miniature vehicle made in accordance with the concepts of the present invention, with a horizontal section through the right rear wheel thereof;

FIG. 2 is a vertical section taken generally along the line 2—2 of FIG. 1;

FIG. 3 is a bottom plan view of the front end of the vehicle chassis shown in FIG. 1;

FIG. 4 is a perspective view of the cross brace or steering bracket for the front steering wheels;

FIG. 5 is a perspective view of the connector block which is pivotally mounted on the vehicle body and operatively connected to the steering bracket shown in FIG. 4;

DETAILED DESCRIPTION OF THE INVENTION

Figure 6:
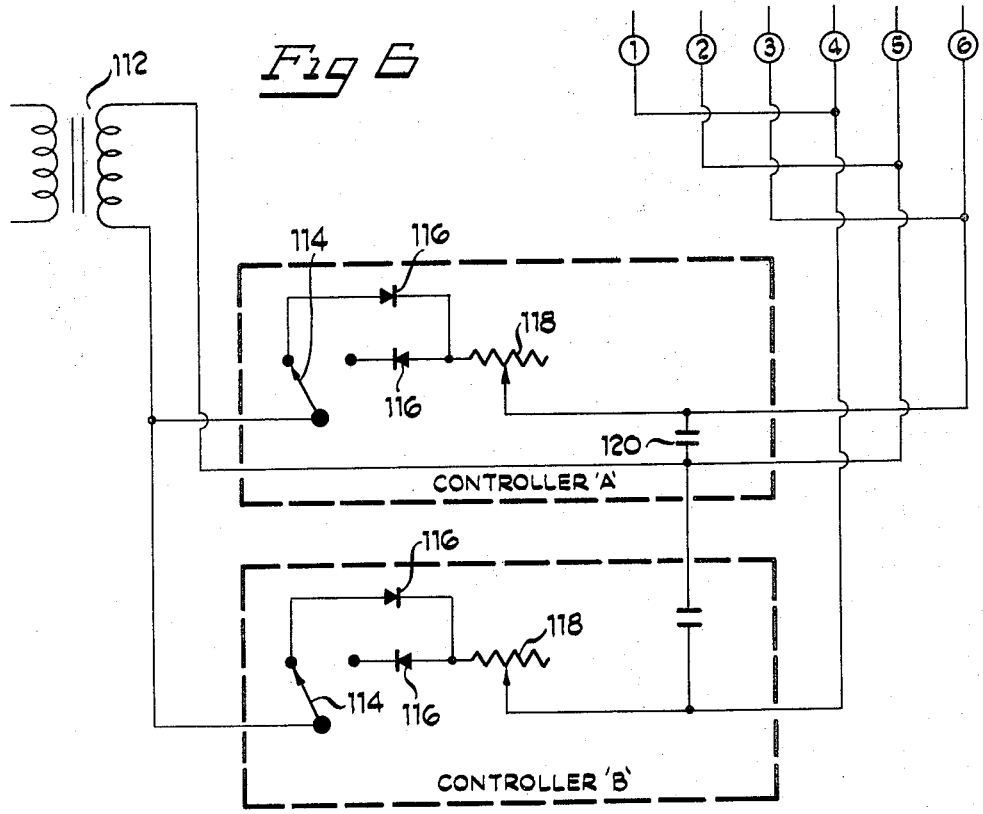
FIG. 6 is a circuit diagram for remotely controlling the vehicles of the present invention, through a six-contact, two-lane track as shown in FIG. 8.
Figure 7:
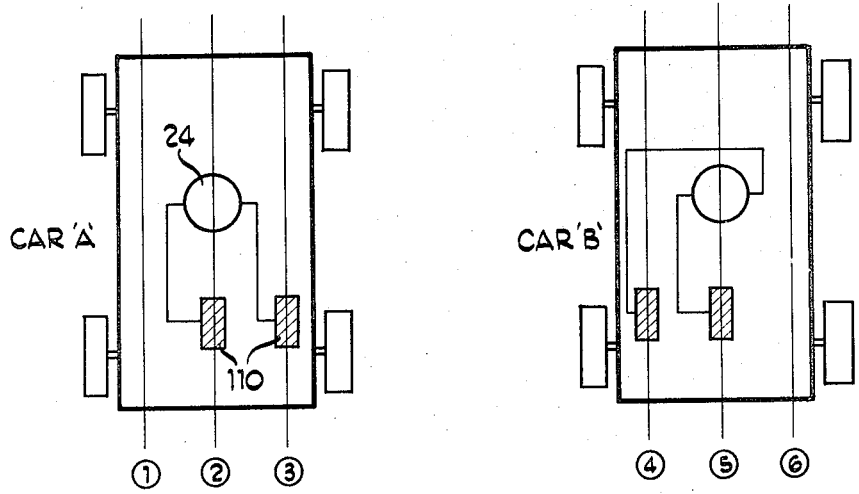
FIG. 7 is a somewhat schematic view of a pair of vehicles in side-by-side relationship, showing the different positions of the current collectors thereof, as connected to the reversible propulsion motors thereof.
Figure 8:
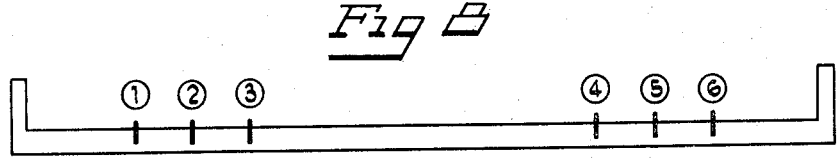
FIG. 8 is a somewhat schematic cross view through a type of track which may be utilized with the vehicles as generally shown herein.

Referring to the drawings in greater detail, a system according to the present invention for operating electrically propelled miniature vehicles along a predetermined path and for remotely controlling the vehicles in a manner to turn out and pass one another at the will of the operator, is shown. The mechanical structure of the chassis of miniature vehicles made in accordance with the concepts of the present invention is shown in FIGS. 1 through 3, and the track and control circuits for utilizing the miniature vehicles are shown in FIGS. 6 through 8. The miniature vehicles first will be described.

Each miniature vehicle includes a chassis having a body or frame portion, generally designated 10, provided with a pair of surface engaging front steering wheels 12 mounted on a front cross brace or steering bracket, generally designated 14. The steering bracket, in turn, is pivotally mounted on the underside of the frame 10, as at 16 (see FIG. 3). A pair of rear surface engaging driving wheels 18a and 18b are fixed for rotation with a rear axle 20. The rear axle is connected through gear trains, generally designated 22a and 22b, to an electrical current responsive reversible propulsion motor 24 for rotating the rear driving wheels 18a, 18b (as described hereinafter) to drive the vehicle forwardly in the direction of arrow A (FIG. 1) regardless of the direction of operation of the propulsion motor. Each rear wheel has a hub portion 26 (FIG. 1) about which is wrapped a more resilient tread portion 28.

As stated above, the propulsion motor 24 is a reversible motor and is connected through the gear trains 22a and 22b to the rear axle in such a manner that the driving wheels are always operatively connected to the propulsion motor for forward rotating movement regardless of the direction of operation of the reversible motor. More particularly, a pinion gear 30 is mounted on the rear end of a drive shaft 32 for the motor 24. Pinion gear 30 is in constant mesh with a cup gear 34 fixed for rotation on a shaft journalled at opposite ends to bracket plates 38 fixed to the frame 10. Also fixed to the shaft 36 for the cup gear 34 is a gear 40 in the gear train 22a and a gear 42 in the gear train 22b. Each of the gears 34, 40 and 42 are rotated in unison with the shaft 36 by means of the pinion gear 30 on the rear end of the motor drive shaft 32.

Should the motor 24 be operating in a direction so as to rotate the pinion gear 30 in the direction of arrow B (FIG. 1), each of the gears 34, 40 and 42 on shaft 36 will be rotated in the direction of arrow C. Gear 40 thus rotates a gear 44 which is in mesh therewith in the gear train 22a in the direction of arrow D. Gear 44 is in mesh with a gear 46 which is rotatably journalled on the rear axle 20 and which is fixed to the inner half 48 of a one-way clutch, generally designated 50. The other half 52 of the clutch 50 is fixed to the rear axle whereby rotation of gear 46 in the direction of arrow E (in response to rotation of gear 44 in the direction of arrow D) engages the clutch and rotates the rear driving wheels 18a, 18b on axle 20 forwardly in the direction of arrow F.

As the motor pinion gear 30 is driven in the direction of arrow B, gear 42 on shaft 36 is in mesh with a gear 54 to rotate the gear 54 in the direction of arrow G. Gear 54, like gear 46, is rotatably journalled on the rear axle 20 and is fixed for rotation with the inner half 56 of a one-way clutch, generally designated 58. The outer half 60 of the clutch 58 is fixed to the rear axle 20 and thus the rear driving wheels 18a, 18b. However, clutch 58 is oppositely oriented in relation to one-way clutch 50 so that as the rear wheels are driven forwardly by clutch 50, clutch 58 is drivingly disengaged.

When the motor 24 is reversed, pinion gear 30 is driven in a direction opposite that of arrow D and, in effect, causes gears 34, 44, 46 and 54 to be driven in a direction opposite that of arrows C, D, E and G, respectively. However, when the gears are driven in this opposite direction, clutch 50 is operatively disengaged and "slips" during operation of the motor in the opposite direction, while clutch 58 engages to drive the rear axle 20 and the rear driving wheels forwardly in the direction of arrow F. Consequently, regardless of the direction of operation of the reversible motor 24, the rear driving wheels 18a and 18b will always be driven in a forward direction.

A spring 62 biases the inner halves 48 and 56 of the one-way clutches 50 and 58, respectively, outwardly for engagement with the outer halves 52 and 60, respectively, of the clutches.

In order to provide for steering the vehicle in response to opposite directions of operation of the reversible motor 24, a pinion gear 64 is fixed to the front end of the motor drive shaft 32 and is in mesh with a larger gear 66. Gear 66 is fixed for rotation with a smaller pinion gear 68 which, in turn, is in mesh with a larger gear 70 on the rear end of a threaded shaft 72 for rotating the shaft. The shaft 72 is journalled in a front support plate 74 and a rear support plate 76 and is independently rotatable relative to the motor drive shaft 32 and pinion gear 64. Thus, through the gears 66 and 68 which operatively connect the motor pinion gear 64 and the shaft gear 70, a speed reduction is provided between the motor and the shaft and thereby more power is produced.

A nut 78 is threaded on the shaft 72 and has a downwardly depending follower pin 80, as best seen in FIG. 2. Follower pin 80 is received in a cam slot, generally designated 82 of a connector or steering block 84 shown in perspective in FIG. 5. The connector block 84 is pivoted by a pin 86 (FIG. 2) to the vehicle frame 10 and, in turn, has a downwardly depending pin 88 which extends through a slot 90 in the vehicle body 10, the slot being elongated fore and aft of the vehicle. The pin 88 on the underside of the connector block is received within a slot between a pair of ear portions 92 of the steering bracket 14.

Thus, it will be seen that pivotal movement of the connector block in the direction of double-headed arrow H (FIG. 1), through abutment between the connector block pin 88 and the ears 92 of the steering bracket, will cause the steering bracket to pivot in the direction of double-headed arrow I (FIG. 3) about point 16. The slot 82 comprises a cam slot whereby forward movement of the follower pin 80 on the nut 78 effects steering of the vehicle to the left while rearward movement of the nut 78 on the shaft 72 effects steering movement of the vehicle to the right. More particularly, the slot 82 has a direction controlling boss 94 which splits the center of the slot into right and left portions 96 and 98, respectively. the Thus, as the nut 72 moves rearwardly from the position shown in FIG. 1 (e.g., in response to rotation of the pinion gear 64 in the direction of arrow J in FIG. 1) the follower pin 80 on the underside thereof will move rearwardly therewith and engage the left side of the boss 94 in the slot 82 and move into the lefthand slot portion 98. As the pin continues to move rearwardly with the nut 78, the pin will abut against the left side of the boss 94 and pivot the rear end of the connector block 84 to the right, about pin 86 in the direction of arrow K (FIG. 1). Pivotal movement of the connector block 84 to the right in the direction of arrow K, through the pin 88, biases the front end of the steering bracket 14 to the right and thus cants the front wheels 12 to the right in the direction of arrows L (FIG. 1) and steers the vehicle to the right. As the nut 78 continues rearwardly it enters the rear end of the slot 82 and pivots the above described components in an opposite direction to again straighten the front wheels 12 and move the vehicle forwardly in a generally straight direction.

In order to steer the vehicle to the left, the motor 24 is reversed to drive the pinion gear 64 opposite the direction of arrow J and cause the nut 78 to move forwardly and into the righthand slot portion 96 to effect canting of the front wheels 12 opposite the directions of arrows L (FIG. 1) to steer the vehicle to the left while the connector block 84 and steering bracket 14 move opposite the directions described above regarding steering the vehicle to the right.

The ends of the shaft 72 have unthreaded portions which are surrounded by springs 100 so that there will be lost motion between the shaft and the nut 78 when the nut reaches the extreme front and rear ends of the slot 82 to prevent binding and permit the motor 24 to continuously drive the vehicle forwardly after the front wheels 12 have been steered and again straightened.

The springs 100 urge the nut 78 toward the center threaded portion of the shaft 72 to facilitate initial threaded movement of the nut and the shaft.

A strap 104 is provided for mounting the motor 24 onto the body 10. A pair of contact brackets 106 are snap fit onto the body and are in engagement with terminal contacts 108 of the motor. The contact brackets, in turn, are connected to current collectors 110 on the underside of the vehicle, in two of three possible positions, as seen in FIG. 7, so that the vehicle collects current for its respective propulsion motor 24 from different pairs of contacts on the track, as described hereinafter.

A cross view of a track for use with the vehicles of the present invention is shown in FIG. 8 and has six contact strips numbered one through six, three for each lane, with two different pairs of each set of three contacts providing independent operation for a pair of vehicles such as those indicated in FIG. 7 as cars "A" and "B". Car "A" collects current for its respective propulsion motor 24 from common contact strips 2 and 5 by its center current collector 110 and from either contact strips 3 or 6 by its righthand current collector. Car "B" collects current from the common contact strips 2 and 5 plus the lefthand contact strips 1 or 4.

FIG. 6 shows circuitry for the six-contact track, having two three-contact lanes side-by-side along the track, with controllers "A" and "B" for cars "A" and "B," respectively. The power supply comprises a single secondary transformer 112 in circuit with the two identical hand controllers "A" and "B" for identical vehicles, Cars "A" and "B," respectively. The only difference is that the cars have differently disposed current collectors 110 to permit the vehicles to independently change lanes at will and/or race in the same lane. Each controller has a hand reversing switch 114 connected through oppositely oriented diodes 116 and speed controllers 118 to the respective contact strips on the track. Thus, a half wave system is provided capable of providing positive or negative half cycle pulses simultaneously with respect to the common contacts on the track. Since the system employs half wave rectification, some filtering must be used to smooth the pulses to the propulsion motors 24 in order to provide proper torque and avoid motor heating. In addition, the capacitors must be capable of filtering either positive or negative power pulses. Thus, nonpolarized electrolytic capacitors 120 are provided inside of the controllers so as to keep the vehicles substantially identical.

The foregoing detailed description has been given for clearness of understanding only and no unnecessary limitations should be understood therefrom as some modifications will be obvious to those skilled in the art.

We claim:

1. A system for operating electrically propelled miniature vehicles along a predetermined path and for remotely controlling the vehicles in a manner to turn out and pass one another at the will of the operator, said vehicles each including a body provided with at least one surface engaging steering wheel turnable about a generally vertical axis for guiding the direction of movement of the vehicle, steering means to turn said steering wheel to direct the vehicle in predetermined directions, surface engaging driving wheel means on said body, an electrical responsive reversible propulsion motor on said body for operating said driving wheel means, first drive means operatively connecting the propulsion motor to the driving wheel means for transmitting power from the motor to the driving wheel means, a roadbed travelled by said vehicles having side-by-side current conductive lanes with substantially flush tread surfaces permitting said vehicles to transfer from one lane to another, current collectors on said vehicles operatively connected to the respective propulsion motors and in conductive contact with either of said lanes, the improvement comprising:

second drive means operatively connecting the propulsion motor to said steering wheel for turning the steering wheel in one direction in response to operation of the motor in a given direction and for turning the steering wheel in an opposite direction in response to operation of the motor opposite said given direction; and clutch means operatively connected between said first drive means and the driving wheel means to drive the driving wheel means in the same direction during operation of the motor in either direction.

2. The invention of claim 1 wherein said clutch means includes gear trains having oppositely oriented one-way clutches so as to drive said driving wheel means regardless of the direction of operation of said motor.

3. The invention of claim 1 including circuit means connected to a source of current and to said current conductive lanes and having circuit components operatively associated with said current conductive lanes and said vehicle current collectors so as to permit operators of a pair of vehicles to control the direction of current to the propulsion motor of a respective vehicle independently of the control of the current direction to the motor of the other vehicle.

4. A system for operating miniature vehicles wherein a vehicle comprises:

a body provided with at least one surface engaging steering wheel;

steering means to turn said steering wheel to direct the vehicle;

surface engaging driving wheel means on said body;

a reversible propulsion motor for driving said driving wheel means;

first drive means operatively connecting the propulsion motor to the driving wheel means for transmitting power from the motor to the driving wheel means;

remote control means operatively associated with each of said vehicles to remotely control the operating direction of the motor of a respective vehicle independently of the control of the operating direction of any other vehicle;

second drive means operatively connecting the propulsion motor to the steering wheel for turning the steering wheel in one direction in response to operation of the motor in a given direction and for turning the steering wheel in an opposite direction in response to operation of the motor opposite said given direction; and clutch means operatively connected between said first drive means and the driving wheel means to drive the driving wheel means in the same direction during operation of the motor in either direction.

5. The invention of claim 4 wherein said clutch means includes gear trains having oppositely oriented one-way clutches so as to drive said driving wheel means regardless of the direction of operation of said motor.

6. The invention of claim 4 wherein said system includes a roadbed travelled by said vehicles having side-by-side current conductive lanes with substantially flush tread surfaces permitting said vehicles to transfer from one lane to another, current collectors on said vehicles operatively connected to the respective propulsion motors and in conductive contact with either of said lanes, and circuit means connected to a source of current including the remote control means associated with said current conductive lanes and said vehicle current collectors so as to permit operators of a pair of vehicles to control the direction of current to the propulsion motor of a respective vehicle independently of the control of the current direction to the motor of the other vehicle.

7. A system for operating electrically propelled miniature vehicles along a predetermined path and for remotely controlling the vehicles in a manner to turn out and pass one another at the will of the operator, said vehicles each including a body provided with at least one surface engaging steering wheel turnable about a generally vertical axis for guiding the direction of movement of the vehicle, steering means to turn said steering wheel to move the vehicle in predetermined directions, surface engaging driving wheel means on said body, an electrical responsive reversible propulsion motor on said body for operating said driving wheel means, and drive means operatively connecting the propulsion motor to the driving wheel means for transmitting power from the motor to the driving wheel means, the improvement in said steering means comprising:

second drive means connecting the propulsion motor to said steering wheel for turning the steering wheel in one direction in response to operation of the motor in a given direction and for turning the steering wheel in an opposite direction in response to operation of the motor opposite said given direction, and a cross brace pivotally mounted on said body and connected to said steering wheel to turn the steering wheel in response to pivotal movement of the cross brace, wherein said connecting means effects opposite pivotal movements of the cross brace in response to opposite directions of operation of the propulsion motor.

8. The invention of claim 7 wherein said connecting means comprises an elongated threaded shaft extending fore and aft of the vehicle and rotated by said propulsion motor, and coupling means for effecting opposite pivotal movements of the cross brace in response to opposite rotational movement of said threaded shaft.

9. The invention of claim 8 wherein said coupling means includes a nut threaded on said shaft for fore and aft movement in response to rotational movement of said shaft, and a connector block movably mounted on said body and operatively connected to said nut to pivotally move said cross brace in response to fore and aft movement of said nut.

10. The invention of claim 9 wherein said nut and connector block are connected by cam and cam follower means in the form of a follower pin on one of the nuts and the connector block received in a cam slot on the other.

11. The invention of claim 10 wherein said connector block is pivoted on said body and is connected to said cross brace by a pin and slot connection to provide for lost motion to pivot the cross brace in response to pivotal movement of the connector block.

* * * * *